(12) United States Patent
Cheng

(10) Patent No.: US 11,581,955 B2
(45) Date of Patent: Feb. 14, 2023

(54) TRANSCEIVING DEVICE AND CALIBRATION METHOD THEREOF

(71) Applicant: REALTEK SEMICONDUCTOR CORPORATION, Hsinchu (TW)

(72) Inventor: Shin-Lin Cheng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/391,910

(22) Filed: Aug. 2, 2021

(65) Prior Publication Data

US 2022/0303025 A1    Sep. 22, 2022

(30) Foreign Application Priority Data

Mar. 16, 2021   (TW) .................. 110109368

(51) Int. Cl.
| | | |
|---|---|---|
| *H04B 3/46* | (2015.01) | |
| *H04B 17/00* | (2015.01) | |
| *H04B 17/21* | (2015.01) | |
| *H04B 17/11* | (2015.01) | |

(52) U.S. Cl.
CPC ......... *H04B 17/0085* (2013.01); *H04B 17/11* (2015.01); *H04B 17/21* (2015.01)

(58) Field of Classification Search
CPC .... H04B 17/21; H04B 7/0682; H04B 17/318; H04B 1/0475; H04B 7/0085; H04B 17/11; H04L 27/3863; H04L 27/368; H04L 27/22; H04L 27/3872; H04L 7/0025; H04L 7/0004; H04L 2027/0016; H04L 2027/0018; H04L 27/3836; H03J 2200/29; H03F 2200/336; H03F 1/3247; H03F 1/3294; H03D 3/009
USPC ......... 375/244, 219, 259, 224; 342/118, 174
See application file for complete search history.

(56) References Cited

U.S. PATENT DOCUMENTS

| | | | | |
|---|---|---|---|---|
| 10,069,577 | B1 * | 9/2018 | Kuan ...................... | H04B 17/11 |
| 10,333,764 | B1 * | 6/2019 | Arditti ................... | H03C 3/403 |
| 2010/0178891 | A1 * | 7/2010 | Wen ........................ | H04B 17/10 455/226.1 |
| 2012/0314736 | A1 * | 12/2012 | Delaunay ............. | H04B 1/0475 375/297 |

(Continued)

FOREIGN PATENT DOCUMENTS

EP         1120944 A2    8/2001

*Primary Examiner* — Khai Tran
(74) *Attorney, Agent, or Firm* — WPAT, P.C., Intellectual Property Attorneys; Anthony King

(57) ABSTRACT

A transceiving device includes a calibration signal generation unit, a phase adjusting unit, a transmission unit, a receiving unit, and a calibration unit. In a calibration mode, the calibration signal generation unit generates an in-phase (I) test signal and a quadrature (Q) test signal. The phase adjusting unit adjusts the I test signal and the Q test signal to generate an adjusted I test signal and an adjusted Q test signal according to a phase controlling signal. The transmission unit generates a radio frequency (RF) signal according to the adjusted I test signal and the adjusted Q test signal. The receiving unit receives the RF signal so as to generate an I receiving signal and a Q receiving signal. The calibration unit generates the phase controlling signal according to the I test signal, the Q test signal, the I receiving signal, and the Q receiving signal.

20 Claims, 2 Drawing Sheets

(56) References Cited

U.S. PATENT DOCUMENTS

| | | | | |
|---|---|---|---|---|
| 2013/0065623 A1* | 3/2013 | Gummadi | ............... | H04L 5/003 |
| | | | | 455/501 |
| 2013/0121389 A1* | 5/2013 | Ly-Gagnon | ........... | H04L 27/364 |
| | | | | 375/221 |
| 2014/0204986 A1* | 7/2014 | Suissa | ................. | H04L 27/0014 |
| | | | | 375/224 |
| 2014/0341263 A1* | 11/2014 | Wu | ........................ | H04B 17/21 |
| | | | | 375/224 |

* cited by examiner

TRANSCEIVING DEVICE AND CALIBRATION METHOD THEREOF

CROSS-REFERENCE TO RELATED APPLICATIONS

This application claims the benefit of priority to Patent Application No. 110109368, filed in Taiwan on Mar. 16, 2021, which is incorporated by reference in its entirety.

TECHNICAL FIELD

The present application relates to a transceiving device; in particular, to a transceiving device that can be calibrated and a method for calibrating the same.

BACKGROUND

Transceiver devices may suffer from an IQ mismatch issue, and hence, an IQ calibration is required. Before performing IQ calibration, the receiver performs analog-to-digital conversion on the signal. In order to obtain a digital IQ signal with a high signal-to-noise ratio, the receiver must effectively utilize the dynamic range of the analog-to-digital conversion, and the receiver performs another analog-to-digital conversion after adjusting the analog signal before the analog-to-digital converter according to the power of the IQ signal. However, when the transmitter transmits the IQ signal, the phase rotation of the IQ signal may occur due to the transmitter's non-ideal effects. The phase rotation changes the phase of the IQ signal and affects the receiver's power adjustment of the IQ signal, which in turn affects the dynamic range usage efficiency of the analog-to-digital conversion and the signal-to-noise ratio of the resulting digital IQ signal. Therefore, the transceiver requires a phase calibration method for the IQ signal to address these issues.

SUMMARY OF THE INVENTION

An aspect of the present disclosure provide a transceiving device which includes a calibration signal generation unit, a phase adjusting unit, a transmission unit, a receiving unit, and a calibration unit. The calibration signal generation unit is configured to generate an in-phase test signal and a quadrature test signal in a calibration mode. The phase adjusting unit is configured to adjust the in-phase test signal and the quadrature test signal to generate an adjusted in-phase test signal and an adjusted quadrature test signal according to a phase controlling signal. The transmission unit is configured to generate a radio frequency signal according to the adjusted in-phase test signal and the adjusted quadrature test signal. The receiving unit is configured to receive the radio frequency signal so as to generate an in-phase receiving signal and a quadrature receiving signal. The calibration unit is configured to generate the phase controlling signal according to the in-phase receiving signal, the quadrature receiving signal, the in-phase test signal, and the quadrature test signal.

Another aspect of the present disclosure provide method for calibrating a transceiving device, which includes the steps of: generating an in-phase test signal and a quadrature test signal; adjusting the in-phase test signal and the quadrature test signal to generate an adjusted in-phase test signal and an adjusted quadrature test signal according to a phase controlling signal; generating a radio frequency signal according to the adjusted in-phase test signal and the adjusted quadrature test signal; receiving the radio frequency signal so as to generate an in-phase receiving signal and a quadrature receiving signal; and generating the phase controlling signal according to the in-phase receiving signal, the quadrature receiving signal, the in-phase test signal, and the quadrature test signal.

The transceiver of this application uses an internal loop to obtain the phase difference between the IQ signal at the input and the output, and pre-adjusts the phase of the IQ signal to obtain an IQ signal with no phase difference relative to the input end to facilitate subsequent IQ calibration operation. Compared with conventional arts, the present IQ signal has a better signal quality.

BRIEF DESCRIPTION OF THE DRAWINGS

Aspects of the present disclosure are best understood from the following detailed description when read with the accompanying drawings. It is noted that, in accordance with the standard practice in the industry, various features are not drawn to scale. In fact, the dimensions of some features may be arbitrarily increased or reduced for clarity of discussion.

DETAILED DESCRIPTION

Figure 1:
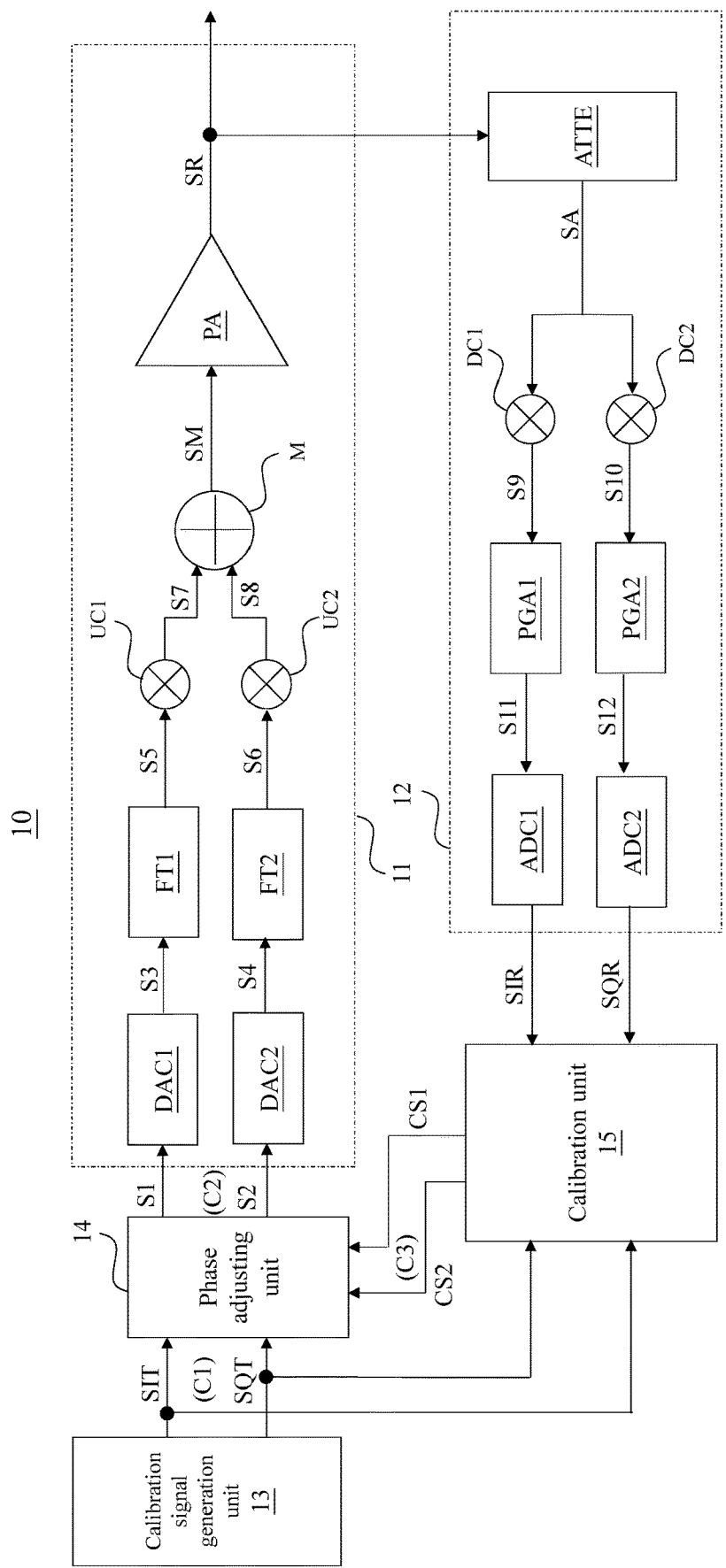
FIG. 1 is a schematic diagram illustrating a transceiving device according to some embodiments of the present disclosure.

FIG. 1 is a schematic diagram illustrating a transceiving device 10 according to some embodiments of the present disclosure. The transceiving device 10 is an in-phase (I) and quadrature (Q) modulation communication system. When the transceiving device 10 operates under a normal mode, the transceiving device 10 uses a transmission unit 11 to generate a signal, which is transmitted via an antenna (not shown in the drawings) to other transceiving devices (not shown in the drawings), or uses a receiving unit 12 to receive, via the antenna, a signal from other transceiving devices. Before the normal mode, the transceiving device 10 often performs a matching calibration between the in-phase path and the quadrature path. However, because some components (e.g., the power amplifier PA) in the transceiving device 10 produce group delay, the signal's phase can be rotated, thereby resulting in a phase difference $\Delta\varphi$ between the received signal and the transmitted signal. The phase difference $\Delta\varphi$ may cause one of the in-phase signal or the quadrature signal received by the receiving unit 12 to be amplified while the other is attenuated, so that the gain controller PGA1 or PGA2 cannot perform on a better gain, thereby resulting in a lower signal-to-noise ratio. For example, the transceiver may cause a phase rotation of $-45°$, and a set of complex signal $(1+1j)$ becomes $(\sqrt{2}+0j)$ after the phase ratio. The difference of the amplitude in the real part of the signal is $\sqrt{2}$ times, and the receiver must reduce the gain by a factor of $\sqrt{2}$ to avoid overflowing of the subsequent analog-to-digital converter. Because of the reduction in the gain, the signal-to-noise ratio of the digital signal generated by the analog-to-digital converter is reduced. Therefore, the transceiving device 10 of the present disclosure additionally enters a group delay calibration mode (hereinafter, the calibration mode) to calibrate the above-mentioned phase rotation prior to the matching calibration.

The transceiving device 10 of the present disclosure uses a calibration signal generation unit 13 to generate an in-phase test signal SIT and a quadrature test signal SQT (hereinafter, the SIT signal and the SQT signal), and uses an internal loop formed sequentially by a phase adjusting unit 14, a transmission unit 11, and the receiving unit 12 to generate an in-phase receiving signal SIR and a quadrature receiving signal SQR (hereinafter, the SIR signal and the SQR signal), so that the calibration unit 15 can generate an in-phase phase controlling signal (hereinafter, the CS1 signal) and a quadrature phase controlling signal CS2 (hereinafter, the CS2 signal) to the phase adjusting unit 14 according to the SIT signal, the SQT signal, the SIR signal, and the SQR signal, so as to cancel the to the phase difference Δφ resulted from the transceiving device 10. The details are discussed below.

The phase adjusting unit 14 adjusts the SIT signal and the SQT signal to generate an adjusted in-phase test signal S1 (hereinafter, the S1 signal) and an adjusted quadrature test signal S2 (hereinafter, the S2 signal) according to the in-phase phase controlling signal CS1 and the quadrature phase controlling signal CS2. Specifically, the SIT signal and the SQT signal are respectively a real part signal and an imaginary part signal of a test complex signal C1, and hence, the test complex signal C1 can be expressed as SIT+j*SQT; the S1 signal and the S2 signal are respectively a real part signal and an imaginary part signal of an adjusted complex signal C2, and hence, the adjusted complex signal C2 can be expressed as S1+j*S2; and the CS1 signal and the CS2 signal are respectively a real part signal and an imaginary part signal of a phase control complex signal C3, and hence, the phase control complex signal C3 can be expressed as CS1+j*CS2, wherein the phase control complex signal C3 represents the phase configured to control the phase adjusting unit 14 to perform the adjustment. In other words, the phase adjusting unit 14 is configured to perform a multiplication operation based on the received test complex signal C1 and the phase control complex signal C3 to obtain the adjusted complex signal C2. Since the S1 signal and the S2 signal are respectively the real part signal and imaginary part signal of the SIT signal and the SQT signal that are adjusted by the signal and the CS2 the multiplication operation can be expressed as the following mathematical formula: the S1 signal=SIT*CS1−SQT*CS2; and the S2 signal=SIT*CS2+SQT*CS1.

In some embodiments, in order to reduce the calculation's complexity, the calibration signal generation unit 13 generate the SIT signal and the SQT signal that are respectively 1 and 0.

After going through the phase adjustment by the phase adjusting unit 14, the phase difference Δφ1 between the S1 signal and the S2 signal relative to the SIT signal and the SQT signal is the negative value of the phase difference Δφ, wherein the phase difference Δφ1 equals to the phase of the phase control complex signal C3 (CS1+j*CS2). In this way, before transmitting the S2 signal and the S1 signal into the transmission unit 11, the phase difference Δφ resulted from the non-ideal effect of the transceiving device 10 during transmission in the S2 signal and the S1 signal is canceled by adjusting the phase oppositely in advance. It is noted that the phase adjusting unit 14 is only used to increase the signal-to-noise ratio during subsequent matching calibration and is not used in the normal mode. Therefore, under the normal mode, the phase adjusting unit 14 does not change the phase of the S1 signal and the S2 signal relative to the SIT signal and the SQT signal. That is, the phase difference Δφ1 between the S2 signal and the S1 signal relative to the SIT signal and the SQT signal is 0.

In the transmission unit 11, a digital-to-analog converter DAC1, a filter FT1, and an upconverter UC1 form an in-phase signal transmission path, whereas a digital-to-analog converter DAC2, a filter FT2, and an upconverter UC2 form a quadrature signal transmission path. In the calibration mode, the digital-to-analog converter DAC1 and the digital-to-analog converter DAC2 respectively perform the digital-to-analog conversion on the S1 signal and the S2 signal to generate an analog signal S3 and an analog signal S4. The filter FT1 and the filter FT2 respectively filter the analog signal S3 and the analog signal S4 to generate a shaped signal S5 and a shaped signal S6. The upconverter UC1 and the upconverter UC2 respectively upconvert the shaped signal S5 and the shaped signal S6 into an upconverted signal S7 and an upconverted signal S8 according to a carrier angular frequency. A combiner M in the transmission unit 11 combines the upconverted signal S7 and the upconverted signal S8 as a combined signal SM. The power amplifier PA adjusts the combined signal SM (e.g., the power amplifier PA provides a gain to the combined signal SM according to a specific gain value) to generate a radio frequency signal SR according to a gain value. In some embodiments, a phase difference of the radio frequency signal SR relative to the combined signal SM approximates the phase difference Δφ generated by the transceiving device 10. In other words, the power amplifier PA is the main component causing the phase difference Δφ in the transceiving device 10. However, the present application is not limited thereto, and each component may contribute at least partially to the phase difference Δφ.

In the calibration mode, the radio frequency signal SR enters the receiving unit 12 via a return path; that is, the receiving unit 12 receives the radio frequency signal SR transmitted from the transmission unit 11. In the receiving unit 12, the downconverter DC1, the gain controller PGA1, and the analog-to-digital converter ADC1 form an in-phase signal transmission path, whereas the downconverter DC2, the gain controller PGA2, and the analog-to-digital converter ADC2 form a quadrature signal transmission path. Generally, the power of the radio frequency signal SR is higher than the saturation power of the downconverter DC1 and the downconverter DC2. To enable the operation of the downconverter DC1 and the downconverter DC2 in the linear region, the receiving unit 12 reduces the power of the radio frequency signal SR through the attenuator ATTE and generates an attenuated signal SA, which is then transmitted to the downconverter DC1 and the downconverter DC2, respectively. The downconverter DC1 and the downconverter DC2 unload the attenuated signal SA according to the carrier angular frequency to respectively generate a downconverted signal S9 and a downconverted signal S10. The gain controller PGA1 and the gain controller PGA2 respectively adjust the downconverted signal S9 and the downconverted signal S10 (e.g., the gain controller PGA1 provides a gain to the downconverted signal S9 according to first gain value, and the gain controller PGA2 supplies a gain to the downconverted signal S10 according to second gain value, wherein the first and second gain values can be the same or different) to generate a post-gain signal S11 and a post-gain signal S12 according to a gain value. The analog-to-digital converter ADC1 and the analog-to-digital converter ADC2 respectively perform the analog-to-digital conversion on the post-gain signal S11 and the post-gain signal S12 to generate the SIR signal and the SQR signal.

In some embodiments, the transceiving device 10 uses a switch (not shown in the drawings) to control the conduction of the return path. The switch is disposed between an output terminal of the power amplifier PA and an input terminal of the attenuator ATTE. In the normal mode, the switch is not conducted so that the radio frequency signal SR is transmitted to the antenna. In the calibration mode, the switch is conducted, so that the radio frequency signal SR can transmit to the receiving unit 12 (in this case, it is unnecessary to shut off the path between the radio frequency signal SR and the antenna).

The calibration unit 15 receives the signal SIT, the SQT signal, the SIR signal, and the SQR signal, and extracts information related to the phase difference $\Delta\varphi$ resulted from the transceiving device 10 from these signals. Specifically, the calibration unit 15 obtains the test complex signal C1 represented by the SQT signal and the SIT signal, and obtains a receiving complex signal represented by the SQR signal and the SIR signal. Thereby, the calibration unit 15 obtains the phase difference $\Delta\varphi$ of the receiving complex signal relative to test complex signal C1. The calibration unit 15 then generates the phase adjusting complex signal C3 that has a phase being the negative value of the phase difference $\Delta\varphi$ according to the phase difference $\Delta\varphi$, and then extracts the real part from the phase adjusting complex signal C3 as the in-phase phase controlling signal and extracts the imaginary part from the phase adjusting complex signal C3 as the quadrature phase controlling signal CS2.

In order to calibrate the rotation resulted from the transceiving device 10, the phase adjusting unit 14 is used to adjust the phase difference $\Delta\varphi1$ between the S1 signal and the S2 signal relative to the SIT signal and the SQT signal to $-\Delta\varphi$. The calibration unit 15 multiplies the phase difference $\Delta\varphi$ by a negative sign, and then converts the same into the phase adjusting complex signal C3, wherein the phase adjusting complex signal C3 has an amplitude of 1. The adjusting unit 14 multiplies the test complex signal C1 with the phase adjusting complex signal C3, and the real part of the product is outputted as the S1 signal, whereas the imaginary part of the product is outputted as the S2 signal. In this case, because the S1 signal and the S2 signal experience phase rotation after being transmitted by the transceiving device 10 (i.e., the phase increases the phase difference $\Delta\varphi$), the phase difference $\Delta\varphi$ between the SIR signal and the SQR signal relative to the SIT signal and the SQT signal becomes $0(-\Delta\varphi+\Delta\varphi)$.

Using the phase calibration function of the internal loop of the transceiving device 10, the calibrated phase difference $\Delta\varphi$ between the SQT signal and the SIT signal relative to the SQR signal and the SIR signal becomes 0, thereby canceling the phase rotation resulted from the transceiving device 10. After the S1 signal and the S2 signal are calibrated, the transceiving device 10 can then perform IQ calibration on the SIR signal and SQR that do not experience phase rotation.

In view of the foregoing, the transceiving device 10 first, in the calibration mode, transmits that non-adjusted S1 signal and S2 signal into the transmission unit 11, and then uses the calibration unit 15 to obtain a phase rotation (the phase difference $\Delta\varphi$) generated due to the non-ideal effect in the transceiving device 10. Then, the calibration unit 15 is used to provide the in-phase phase controlling signal CS1 and the quadrature phase controlling signal CS2 to the phase adjusting unit 14 according to the phase difference $\Delta\varphi$, thereby adjusting the phase rotation of the S1 signal and the S2 signal in advance to cancel the phase rotation. In this way, the present application can cancel the non-ideal effect of the transceiving device 10 using a phase adjustment in advance, thereby increasing the signal-to-noise ratio of the SIR signal and the SQR signal.

Figure 2:
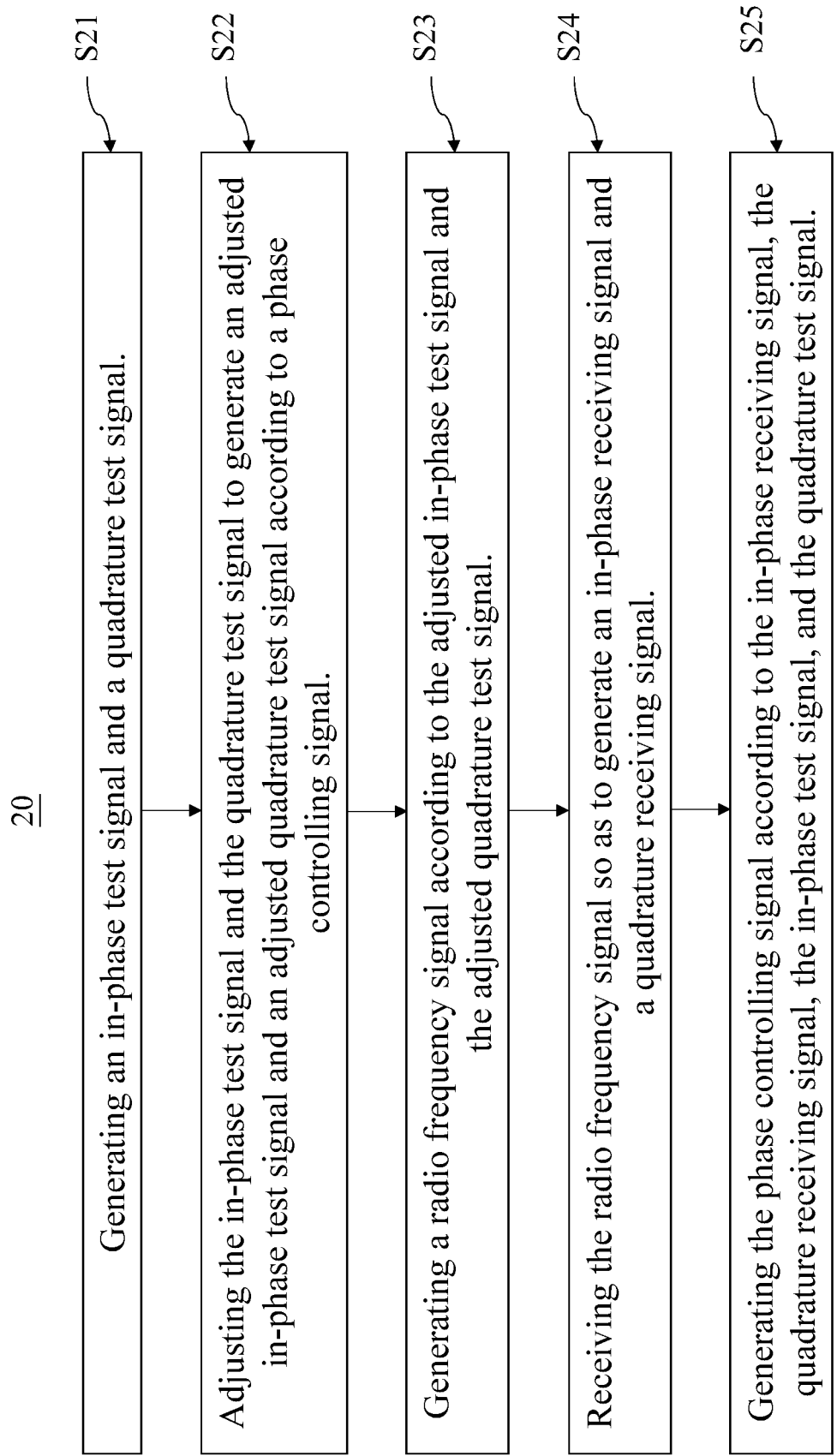
FIG. 2 is a flow chart showing a calibration method according to some embodiments of the present disclosure.

Reference is made to FIG. 2. FIG. 2 is a flow chart of a calibration method 200 according to some embodiments of the present disclosure. In some embodiments, the transceiving device 10 in FIG. 1 uses the calibration method 20 to adjust the SIR signal and the SQR signal. More specifically, the transceiving device 10 in FIG. 1, in a calibration mode, uses the calibration method 20 to increase the signal-to-noise ratio of the SIR signal and the SQR signal. The calibration method 20 includes Steps S21, S22, S23, S24, and S25. To facilitate understanding, the calibration method 20 is discussed using the reference numerals used in FIG. 1. Moreover, the calibration method 20 is not limited to Steps S21~S25. In further embodiments, the calibration method 20 also includes the steps discussed above using the transceiving device 10 in FIG. 1 or in connection with the operation of the transceiving device 10.

In Step S21, an in-phase test signal SIT and a quadrature test signal SQT are generated. In Step S22, the in-phase test signal SIT and the quadrature test signal SQT are adjusted according to the phase control complex signal C3 to generate an adjusted in-phase test signal S1 and an adjusted quadrature test signal S2. In Step S23, a radio frequency signal SR is generated according to the adjusted in-phase test signal S1 and the adjusted quadrature test signal S2. In Step S24, the radio frequency signal SR is received so as to generate an in-phase receiving signal SIR and a quadrature receiving signal SQR. In Step S25, a phase control complex signal C3 is generated according to the in-phase receiving signal SIR, the quadrature receiving signal SQR, the in-phase test the signal SIT, and the quadrature test signal SQT.

In some embodiments, the calibration method 20 generates the phase control complex signal C3 by obtaining the phase difference $\Delta\varphi$ between the complex signal represented by the in-phase receiving signal SIR and the quadrature receiving signal SQR and the test complex signal C1 (i.e., the complex signal represented by the in-phase test the signal SIT and the quadrature test signal SQT), and then adjusts the test complex signal C1 to generate the adjusted complex signal C2 according to the phase control complex signal C3. The signal-to-noise ratio of the in-phase receiving signal SIR and the quadrature receiving signal SQR generated using the above-mentioned operations is increased, thereby increasing the availability of the in-phase receiving signal SIR and the quadrature receiving signal SQR.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:
1. A transceiving device, comprising:
a calibration signal generation unit, configured to generate an in-phase test signal and a quadrature test signal in a calibration mode;
a phase adjusting unit, configured to adjust the in-phase test signal and the quadrature test signal to generate an adjusted in-phase test signal and an adjusted quadrature test signal according to a phase controlling signal;
a transmission unit, configured to generate a radio frequency signal according to the adjusted in-phase test signal and the adjusted quadrature test signal;

a receiving unit, configured to receive the radio frequency signal so as to generate an in-phase receiving signal and a quadrature receiving signal; and a calibration unit, configured to generate the phase controlling signal according to the in-phase receiving signal, the quadrature receiving signal, the in-phase test signal, and the quadrature test signal.

2. The transceiving device of claim 1, wherein the calibration unit is configured to obtain a first phase difference of the in-phase receiving signal and the quadrature receiving signal with respect to the in-phase test signal and the quadrature test signal, and generate the phase controlling signal according to the first phase difference.

3. The transceiving device of claim 2, wherein the phase controlling signal causes the adjusted in-phase test signal and the adjusted quadrature test signal to have a second phase difference with respect to the in-phase test signal and the quadrature test signal, and the second phase difference is a negative value of the first phase difference.

4. The transceiving device of claim 2, wherein the phase controlling signal includes an in-phase phase controlling signal and a quadrature phase controlling signal.

5. The transceiving device of claim 1, wherein the in-phase test signal and the quadrature test signal are respectively a real part signal and an imaginary part signal of a test complex signal, wherein the phase adjustment unit is configured to perform a multiplication operation to obtain an adjusted complex signal according to the test complex signal and the phase controlling signal, wherein the adjusted in-phase test signal and the adjusted quadrature test signal are respectively a real part signal and an imaginary part signal of the adjusted complex signal.

6. The transceiving device of claim 1, wherein the in-phase test signal is 1, and the quadrature test signal is 0.

7. The transceiving device of claim 1, wherein the transmission unit comprises:
 a first digital-to-analog converter, configured to perform digital-to-analog conversion on the adjusted in-phase test signal to generate a first analog signal;
 a first filter, configured to filter the first analog signal to generate a first shaped signal; and
 a first upconverter, configured to upconvert the first shaped signal to generate a first upconverted signal.

8. The transceiving device of claim 7, wherein the transmission unit further comprises:
 a second digital-to-analog converter, configured to perform digital-to-analog conversion on the adjusted quadrature test signal to generate a second analog signal;
 a second filter, configured to filter the second analog signal to generate a second shaped signal;
 a second upconverter, configured to upconvert the second shaped signal to generate a second upconverted signal; and
 a combiner, configured to combine the first upconverted signal and the second upconverted signal as a combined signal.

9. The transceiving device of claim 8, wherein the transmission unit further comprises:
 a power amplifier, configured to adjust the combined signal to generate the radio frequency signal according to a power gain value.

10. The transceiving device of claim 1, wherein the receiving unit comprises:
 an attenuator, configured to attenuate the radio frequency signal to generate an attenuated signal;
 a first downconverter, configured to downconvert the attenuated signal to generate a first downconverted signal;
 a second downconverter, configured to downconvert the attenuated signal to generate a second downconverted signal;
 a first gain controller, configured to adjust the first downconverted signal to generate a first post-gain signal according to a first gain value;
 a second gain controller, configured to adjust the second downconverted signal to generate a second post-gain signal according to a second gain value;
 a first analog-to-digital converter, configured to perform analog-to-digital conversion on the first post-gain signal to generate the in-phase receiving signal; and
 a second analog-to-digital converter, configured to perform analog-to-digital conversion on the second post-gain signal to generate the quadrature receiving signal.

11. A method for calibrating a transceiving device, comprising:
 generating an in-phase test signal and a quadrature test signal;
 adjusting the in-phase test signal and the quadrature test signal to generate an adjusted in-phase test signal and an adjusted quadrature test signal according to a phase controlling signal;
 generating a radio frequency signal according to the adjusted in-phase test signal and the adjusted quadrature test signal;
 receiving the radio frequency signal so as to generate an in-phase receiving signal and a quadrature receiving signal; and
 generating the phase controlling signal according to the in-phase receiving signal, the quadrature receiving signal, the in-phase test signal, and the quadrature test signal.

12. The method of claim 11, wherein the step of generating the phase controlling signal according to the in-phase receiving signal, the quadrature receiving signal, the in-phase test signal, and the quadrature test signal comprises:
 obtaining a first phase difference of the in-phase receiving signal and the quadrature receiving signal with respect to the in-phase test signal and the quadrature test signal; and
 generating the phase controlling signal according to the first phase difference.

13. The method of claim 12, wherein the phase controlling signal causes the adjusted in-phase test signal and the adjusted quadrature test signal to have a second phase difference with respect to the in-phase test signal and the quadrature test signal, wherein the second phase difference is a negative value of the first phase difference.

14. The method of claim 12, wherein the step of generating the phase controlling signal according to the first phase difference comprises:
 generating an in-phase phase controlling signal; and
 generating a quadrature phase controlling signal.

15. The method of claim 11, wherein the in-phase test signal and the quadrature test signal are respectively a real part signal and an imaginary part signal of a test complex signal, wherein the step of generating the adjusted in-phase test signal and the adjusted quadrature test signal according to the phase controlling signal to adjust the in-phase test signal and the quadrature test signal comprises:
 performing a multiplication operation to obtain an adjusted complex signal according to the test complex signal and the phase controlling signal, wherein the adjusted in-phase test signal and the adjusted quadrature test signal are respectively a real part signal and an imaginary part signal of the adjusted complex signal.

16. The method of claim 11, wherein the in-phase test signal is 1, and the quadrature test signal is 0.

17. The method of claim 11, wherein the step of generating the radio frequency signal according to the adjusted in-phase test signal and the adjusted quadrature test signal comprises:
performing digital-to-analog conversion on the adjusted in-phase test signal to generate a first analog signal;
filtering the first analog signal to generate a first shaped signal; and
upconverting the first shaped signal to generate a first upconverted signal.

18. The method of claim 17, wherein the step of generating the radio frequency signal according to the adjusted in-phase test signal and the adjusted quadrature test signal further comprises:
performing digital-to-analog conversion on the adjusted quadrature test signal to generate a second analog signal;
filtering the second analog signal to generate a second shaped signal;
upconverting second shaped signal to generate a second upconverted signal;
combining the first upconverted signal and the second upconverted signal as a combined signal; and
adjusting the combined signal to generate the radio frequency signal according to a power gain value.

19. The method of claim 11, wherein the step of receiving the radio frequency signal so as to generate the in-phase receiving signal and the quadrature receiving signal comprises:
attenuating the radio frequency signal to generate an attenuated signal;
downconverting the attenuated signal to generate a first downconverted signal;
adjusting the first downconvert signal to generate a first post-gain signal according to a gain value; and
performing analog-to-digital conversion on the first post-gain signal to generate the in-phase receiving signal.

20. The method of claim 19, wherein the step of receiving the radio frequency signal so as to generate the in-phase receiving signal and the quadrature receiving signal further comprises:
downconverting the attenuated signal to generate a second downconverted signal;
adjusting the second downconverted signal to generate a second post-gain signal according to the gain value; and
performing analog-to-digital conversion on the second post-gain signal to generate the quadrature receiving signal.

* * * * *